(12) United States Patent
Mandai et al.

(10) Patent No.: US 6,389,796 B1
(45) Date of Patent: May 21, 2002

(54) GAS TURBINE SYSTEM AND COMBINED PLANT COMPRISING THE SAME

(75) Inventors: Shigemi Mandai; Hidetaka Mori; Hideaki Sugishita; Eiji Akita, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/666,188

(22) Filed: Sep. 21, 2000

(30) Foreign Application Priority Data

Oct. 5, 1999 (JP) ............................................ 11-284721

(51) Int. Cl.⁷ ................................................ F02C 3/30
(52) U.S. Cl. .................. 60/39.182; 60/39.41; 60/39.52; 60/39.55
(58) Field of Search ............................ 60/39.41, 39.52, 60/39.182, 39.55

(56) References Cited

U.S. PATENT DOCUMENTS 3,037,345 A * 6/1962 Sonnefeld .................. 60/39.52
3,866,411 A * 2/1975 Marion et al. ............. 60/39.52
3,949,548 A * 4/1976 Lockwood .................. 60/39.52
5,595,059 A * 1/1997 Huber et al. ............... 60/39.52

FOREIGN PATENT DOCUMENTS

| JP | 07-034900 | 2/1995 |
| JP | 10-103021 | 4/1998 |
| JP | 10-259736 | 9/1998 |

* cited by examiner

*Primary Examiner*—Michael Koczo
(74) *Attorney, Agent, or Firm*—Wenderoth, Lind & Ponack, L.L.P.

(57) ABSTRACT

A gas turbine system and a combined plant including the gas turbine system provides a higher effect in realizing a high plant efficiency and reduction of NOx generation. The gas turbine system includes a compressor (1) for compressing combustion air, a combustor (2) for burning fuel with the combustion air, and a gas turbine (3) driven by high temperature gas generated at the combustor (2). A portion of the exhaust gas discharged from the gas turbine (3) is recirculated back into the combustor (2). A combined plant can also include the gas turbine system.

5 Claims, 2 Drawing Sheets

GAS TURBINE SYSTEM AND COMBINED PLANT COMPRISING THE SAME

BACKGROUND OF THE INVENTION

1. Field of the Invention

The present invention relates to a high efficiency gas turbine system and a combined plant comprising this gas turbine system.

2. Description of the Prior Art

One example of a gas turbine system and a combined plant comprising this gas turbine system in the prior art will be described with reference to FIG. 3. FIG. 3 shows a main construction of a prior art example of a combined plant comprising gas turbine system and a steam turbine.

In FIG. 3, combustion air a is compressed at a compressor 01 and is then mixed with fuel b at a combuster 02 to effect a combustion for generating a high temperature combustion gas. This high temperature combustion gas drives a gas turbine 03 to expand and is then supplied into an exhaust gas boiler 05 as exhaust gas c for generating steam there.

A high temperature high pressure steam generated at the exhaust gas boiler 05 drives a steam turbine 06 to expand and is then condensed at a condenser 08. The pressure of the condensed water is elevated by a feed water pump 09 so that the condensed water is circulated into the exhaust gas boiler 05.

A generator 04 is fitted to the gas turbine 03 and another generator 07 is fitted to the steam turbine 06 and so the construction is made such that work each of the turbines 03, 06 may be taken out.

In the combined plant as so constructed, there is currently a high demand for realizing a higher efficiency thereof. Especially, in order for a gas turbine system which constitutes a first stage portion of the combined plant to effect a high temperature combustion of the fuel, further enhancement of the efficiency and reduction of NOx generation are both required. Also, if the gas turbine system comprises a gas turbine unit only, enhancement of the efficiency and reduction of NOx generation are likewise required.

SUMMARY OF THE INVENTION

In view of the mentioned high demand for realizing a higher efficiency and a further reduction of NOx generation in the gas turbine system and the combined plant comprising the same in the prior art, it is an object of the present invention to provide a more effective gas turbine system and combined plant comprising the same.

In order to achieve the mentioned object, the present invention provides the following embodiment.

In a first embodiment, a gas turbine system comprises a compressor for compressing combustion air, a combustor for burning fuel with the combustion air and a gas turbine driven by a high temperature gas generated at the combustor. The gas turbine system is constructed such that a portion of exhaust gas discharged from the gas turbine is recirculated into the combustor.

In the conventional gas turbine system, the combustion gas has a high excess air ratio due to a limitation in the turbine inlet temperature and because the exhaust gas has a high oxygen concentration. However, in the first embodiment of the present invention, a portion of the exhaust gas is recirculated into the combustor and thereby the oxygen concentration in the exhaust gas can be reduced, exhaust loss of the gas turbine system is largely reduced, and generation of NOx is also reduced. Further, as the exhaust gas to be circulated into the combustor has a high steam concentration, work output of the gas turbine is increased because of the physical properties of the high steam concentration.

In a modified embodiment, a gas turbine system as mentioned above further comprises an exhaust gas compressor and is constructed such that the portion of exhaust gas is pressurized by the exhaust gas compressor to be partly recirculated into the combustor and to be partly mixed into the fuel before the fuel is supplied into the combustor.

In the conventional gas turbine system, the combustion gas has a high excess air ratio due to a limitation in the turbine inlet temperature and the exhaust gas has a high oxygen concentration. However, in the present invention, the exhaust gas is circulated into the combustor and thereby the excess air ratio of the combustion gas can be made lower. Hence, oxygen concentration in the exhaust gas can be reduced and exhaust loss from the gas turbine system can be reduced largely.

Also, the exhaust gas of the low oxygen concentration and the fuel are mixed together before the fuel is supplied into the combustor so that a low BUT gas may be formed, and this low BUT gas is mixed with air to burn. Hence, flame temperature can be maintained lower and NOx generation quantity can be reduced. Moreover, the exhaust gas recirculated into the combustor or the fuel has a high steam concentration, work output of the gas turbine is increased because of physical property of the high steam concentration.

In another modified embodiment a gas turbine system as mentioned above is designed so that the exhaust gas pressurized by the exhaust gas compressor is used as cooling gas of the gas turbine.

According to the embodiment above, in addition to the features of the first modified embodiment, the exhaust gas pressurized by the exhaust gas compressor is used as a cooling medium for the gas turbine. Because the exhaust gas has a high steam and $CO_2$ gas concentration, a high cooling effect can be obtained because of physical properties of the high steam and $CO_2$ gas concentration.

In another modified embodiment, a gas turbine system as mentioned above further comprises a condenser through which the exhaust gas passes so that water content in the exhaust gas may be condensed, and the portion of exhaust gas is the water content in the exhaust gas so condensed at the condenser.

According to the embodiment above, if the combustion gas in the combustor has an excessively high temperature even if the excess air ratio is set to a lower level, water injection or steam injection is effected using the water content in the exhaust gas to be circulated into the combustor so that a predetermined turbine inlet temperature may be obtained and the excess air ratio of the combustion gas may be reduced. Therefore, oxygen concentration in the exhaust gas can be reduced and exhaust loss can be largely reduced as compared with the conventional gas turbine system.

Also, flame temperature and oxygen concentration in the combustor can be maintained lower so that NOx generation quantity can be reduced. Moreover, water content concentration in the combustion gas becomes higher so that work output of the gas turbine is increased because of the physical properties of the higher water content concentration.

It is to be noted that if the oxygen concentration in the exhaust gas is maintained lower, then necessarily steam concentration in the exhaust gas becomes higher. Hence, the water content in the exhaust gas can be recovered easily at the condenser so that the water injection or steam injection becomes possible without a make-up water.

Another embodiment is directed to a combined plant comprising the gas turbine system as mentioned in any one of the above embodiments.

According to the embodiment above, a combined plant having a feature of the gas turbine system mentioned in any one of the previous embodiments can be obtained, and a combined plant having a high efficiency and a low NOx generation as a whole can be realized.

DESCRIPTION OF THE PREFERRED EMBODIMENTS

A gas turbine system and a combined plant of a first embodiment according to the present invention will be described with reference to FIG. 1.

Figure 1:
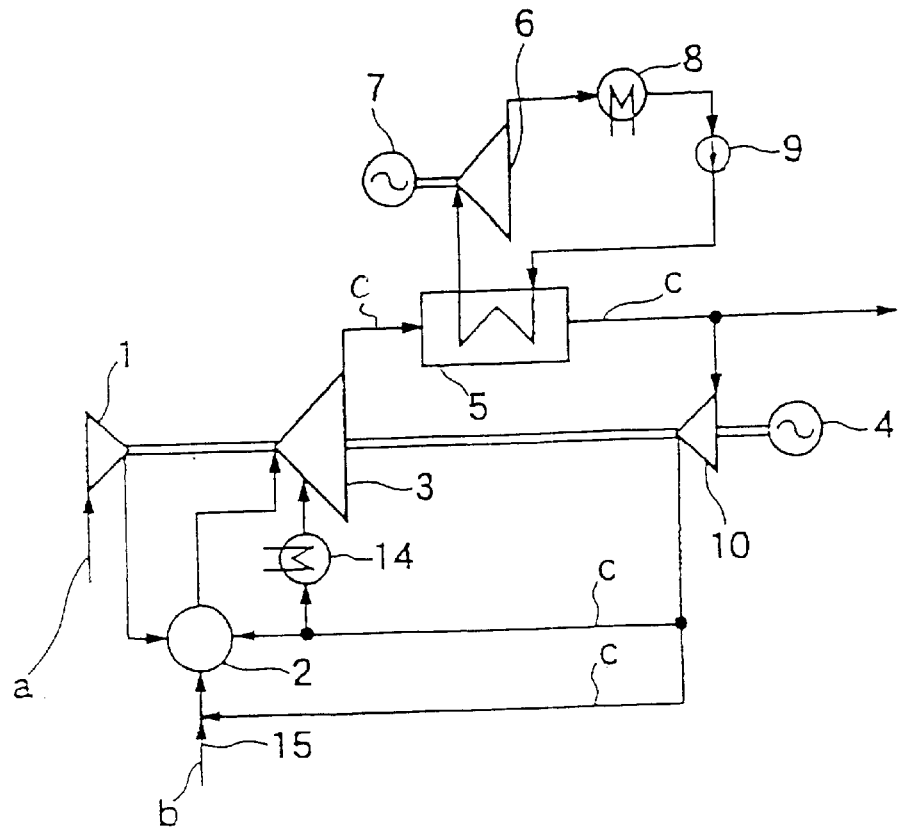
FIG. 1 is an explanatory view of a gas turbine system and a combined plant comprising the same elements as a first embodiment according to the present invention.

FIG. 1 shows a main construction of the combined plant comprising the gas turbine system of the fist embodiment. In FIG. 1, numeral 1 designates a compressor for compressing combustion air a. A gas turbine 3, an exhaust gas compressor 10 and a generator 4 are fitted coaxially to the compressor 1. The combustion air a compressed at the compressor 1 is mixed with fuel b at a combustor 2 to effect a combustion for generating a high temperature combustion gas. This high temperature combustion gas drives the gas turbine 3 to expand and is then discharged as exhaust gas c.

Numeral 5 designates an exhaust gas boiler for recovering waste heat of the exhaust gas c. A high temperature high pressure steam generated at the exhaust gas boiler 5 drives a steam turbine 6 to expand and is then condensed at a condenser 8. The pressure of the condensed water is elevated by a feed water pump 9 so that the condensed water is circulated into the exhaust gas boiler 5.

About a half quantity of the exhaust gas c coming out of the exhaust gas boiler 5 diverges into the exhaust gas compressor 10 to be compressed. A portion of the compressed exhaust gas c is led into the combustor 2 as dilution gas, a portion of the compressed exhaust gas c is led into a cooler 14 to be cooled (or is led as it is) to be further led into the gas turbine 3 as a cooling medium for the gas turbine 3, and the remaining portion of the compressed exhaust gas flows through a supply pipe 15 of the fuel b to mix with the fuel b of gas or liquid before the fuel b is supplied into the combustor 2, so that a low BTU gas may be formed.

The generator 4 is fitted to the gas turbine 3 and a generator 7 is fitted to the steam turbine 6. Thus, the construction is such that work done by each of the turbines 3, 6 may be transformed into power.

In the conventional gas turbine system, the combustion gas has an excess air ratio of 2.6 or more due to limitations in the turbine inlet temperature and, hence, oxygen concentration in the exhaust gas is as high as 13% or more. However, in the present embodiment as mentioned above, the exhaust gas c recirculates into the combustor 2 and thereby the combustion gas can have an excess air ratio of about 1.1, and an oxygen concentration in the exhaust gas can be about 2%. It is noted that the oxygen concentration in the exhaust gas is preferably 10% or less, or more preferably 5% or less. Further, if the oxygen concentration in the exhaust gas is reduced, then it will also suppress a generation of NOx.

Thus, while exhaust loss in a conventional gas turbine system has been about 13%, exhaust loss in the gas turbine system of the present embodiment can be reduced to about a half thereof. This results in enhancement by about 7% of a thermal efficiency of the combined plant as a whole.

Further, the exhaust gas c of the low oxygen concentration and the fuel b of gas or liquid are mixed together before the fuel b is supplied into the combustion 2. Therefore, a low BTU gas of about 1000 $Kcal/Nm^3$ may be formed, and this low BTU gas is mixed with air to burn so that flame temperature can be maintained lower even in a diffusion type combustor and NOx generation quantity can be reduced to 10 ppm or less.

Moreover, the exhaust gas c recirculating into the combustor 2 through the supply pipe 15 of the fuel b has a high steam concentration. Thus, work output of the turbine can be increased because of the physical properties of the high steam concentration.

Also, a portion of the exhaust gas c, as cooled (or as it is), used as a cooling medium for the gas turbine, and the exhaust gas c has a high steam and $CO_2$ concentration. Hence, because of the physical properties thereof, a high cooling effect can be obtained.

A gas turbine system and a combined plant comprising the same as a second embodiment according to the present invention will be described with reference to FIG. 2.

Figure 2:
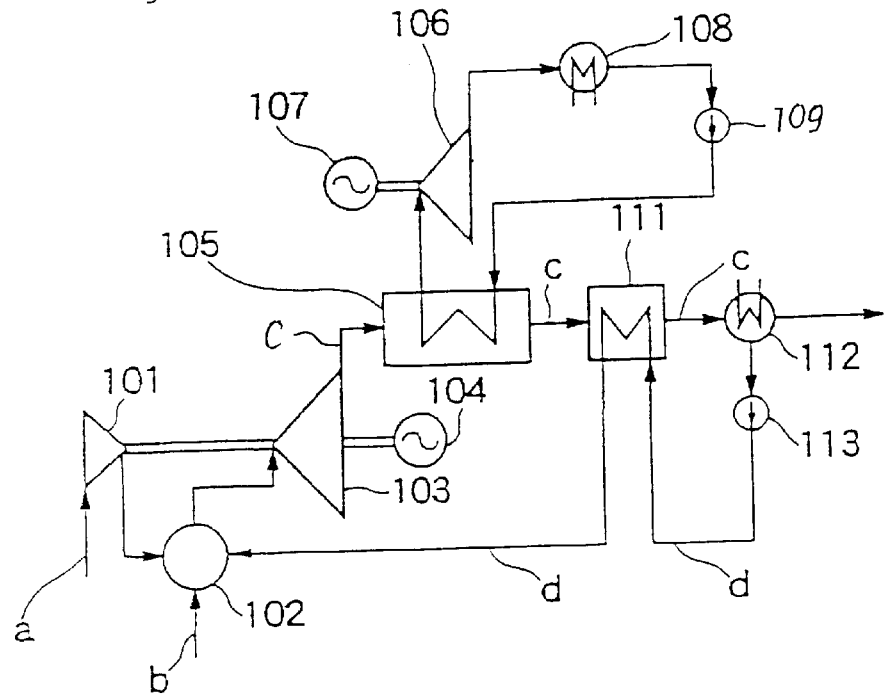
FIG. 2 is an exemplary view of a gas turbine system and a combined plant comprising the same elements as a second embodiment according to the present invention.
Figure 3:
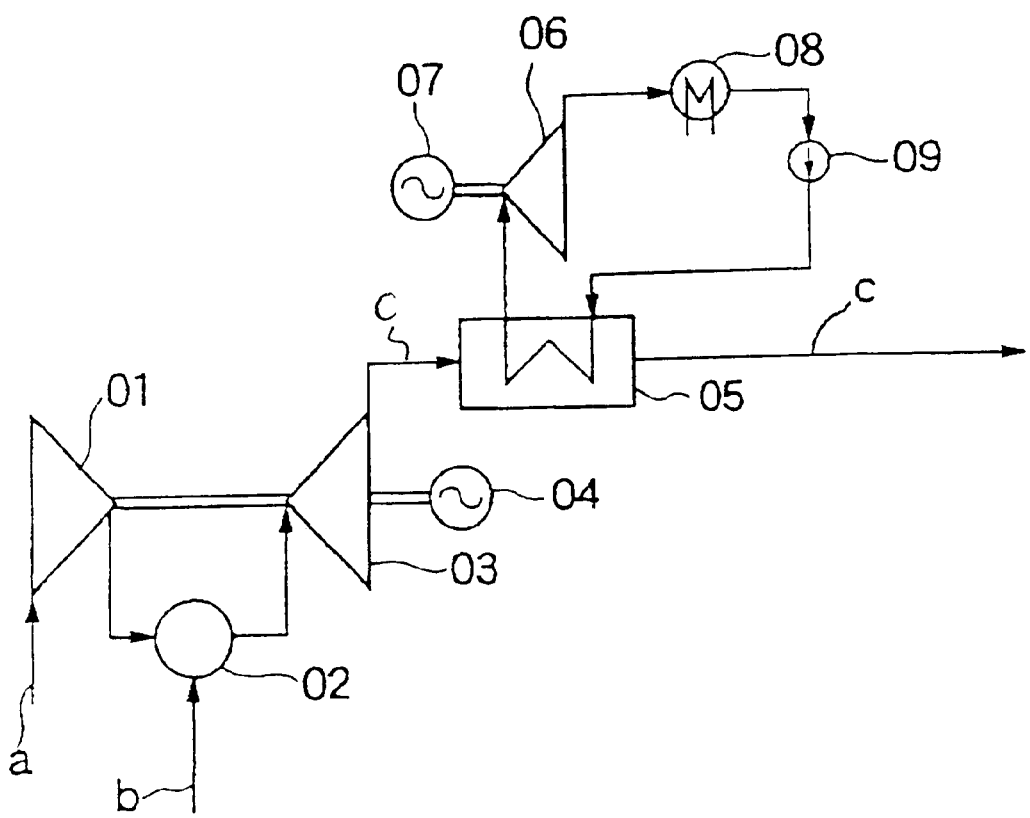
FIG. 3 is an explanatory view of a gas turbine system and a combined plant comprising the same in the prior art.

FIG. 2 shows a main construction of the combined plant comprising the gas turbine system of the second embodiment. In FIG. 2, numeral 101 designates a compressor for compressing combustion air a. A gas turbine 103 and a generator 104 are fitted coaxially to the compressor 101. The combustion air a compressed at the compressor 101 is mixed with fuel b at a combustor 102 to effect a combustion for generating a high temperature combustion gas. This high temperature combustion gas drives the gas turbine 103 to expand and is then discharged as exhaust gas c.

Numeral 105 designates an exhaust gas boiler for recovering waste heat of the exhaust gas c. A high temperature high pressure steam generated at the exhaust gas boiler 105 drives a steam turbine 106 to expand and is then condensed at a condenser 108. The pressure of the condensed water is elevated by a feed water pump 109 so that the condensed water is circulated into the exhaust gas boiler 105.

The exhaust gas c coming out of the exhaust gas boiler 105 heats injection water d, to be described below, at a feed water heater 111, and then passes through a condenser 112 so that water content in the exhaust gas c is condensed and separated. The pressure of the condensed water is elevated by a pump 113, and then the condensed water is heated at the feed water heater 111. The condensed water so pressure-elevated and heated is sent to the combustor 102 of the gas turbine 103 to be used as injection water d, which is injected into the combustor 102.

As the combustion gas generated at the combustor 102 has an excessively high temperature even if excess air ratio thereof is set to about 1.1, water injection or steam injection is effected into the combustor 102 using the injection water d. Therefore, the temperature of the combustion gas is set to a predetermined gas turbine inlet temperature and, at the same time, the excess air ratio of the combustion gas can be reduced.

It is to be noted that the generator 104 is fitted to the gas turbine 103 and a generator 107 is fitted to the steam turbine 106. Therefore, the arrangement is such that work done by each of the turbines 103, 106 may be transformed into power.

In the present embodiment as mentioned above, the water content in the exhaust gas c is recirculated to the combustor 102 to be water-injected or steam-injected thereinto. Thus, the combustion gas can have an excess air ratio of about 1.1, and the oxygen concentration in the exhaust gas can be as low as about 2%. Hence, as compared with the conventional gas turbine system, exhaust loss becomes smaller and thermal efficiency of the entire combined plant can be enhanced. It is to be noted that the oxygen concentration in the exhaust gas is preferably 10% or less, or more preferably 5% or less. Further, if the oxygen concentration in the exhaust gas is reduced, then it will also suppress a generation of Nox.

If the oxygen concentration in the exhaust gas c is maintained lower, then steam concentration in the exhaust gas c necessarily becomes higher. Hence, the water content in the exhaust gas c can be recovered easily at the condenser 112 and thereby the water injection or steam injection becomes possible without make-up water.

Also, flame temperature and oxygen concentration in the combustor 102 can be maintained lower by the water injection or steam injection using the injection water d. Hence, NOx generation quantity can be reduced.

Furthermore, because of the physical properties of the high water content concentration in the exhaust gas, work output of the gas turbine 103 can be increased and the exhaust gas temperature also can be maintained higher.

That is, the gas turbine 103 of the present embodiment uses not only the conventional combustion gas but also a high temperature steam as the working medium. Thus, it has advantages both of the conventional gas turbine and steam turbine.

In the above, while the invention has been described based on the embodiments as illustrated, the invention is not limited thereto. Needless to mention, various modifications in the concrete construction of the invention may be made within the scope of the claims as appended herebelow.

For example, while the gas turbine system employed in the combined plant has been described in either of the embodiments, the gas turbine system of the present invention may be employed with the same function and effect in a plant having a gas turbine only without an exhaust gas boiler or a steam turbine.

What is claimed is:

1. A gas turbine system comprising:
   a compressor for compressing combustion air;
   a fuel line for supplying fuel;
   a combustor for receiving the fuel supplied by said fuel line, for receiving the compressed combustion air compressed by said compressor, and for burning the fuel with the compressed combustion air so as to generate a high-temperature gas;
   a gas turbine for receiving the high-temperature gas generated by said combustor, said gas turbine being operable to be driven by the high-temperature gas so as to generate exhaust gas, and
   an exhaust gas compressor for receiving at least a portion of the exhaust gas generated by said gas turbine and for pressurizing the at least a portion of the exhaust gas to generate a pressurized portion of exhaust gas, an outlet of said exhaust gas compressor being connected to said fuel line such that said fuel line receives a first portion of the pressurized portion of the exhaust gas so as to mix the first portion of the pressurized portion of the exhaust gas with the fuel upstream of said combustor, and said outlet of said exhaust gas compressor being connected to said combustor such that said combustor receives a second portion of the pressurized portion of the exhaust gas.

2. The gas turbine system of claim 1, wherein said outlet of said exhaust gas compressor is connected to said gas turbine such that said gas turbine receives a third portion of the pressurized portion of the exhaust gas so as to be cooled by the third portion of the pressurized portion of the exhaust gas.

3. A combined power plant comprising:
   a compressor for compressing combustion air;
   a fuel line for supplying fuel;
   a combustor for receiving the fuel supplied by said fuel line, for receiving the compressed combustion air compressed by said compressor, and for burning the fuel with the compressed combustion air so as to generate a high-temperature gas;
   a gas turbine for receiving the high-temperature gas generated by said combustor, said gas turbine being operable to be driven by the high-temperature gas so as to generate exhaust gas;
   an exhaust gas compressor for receiving at least a portion of the exhaust gas generated by said gas turbine and for pressurizing the at least a portion of the exhaust gas to generate a pressurized portion of exhaust gas, an outlet of said exhaust gas compressor being connected to said fuel line such that said fuel line receives a first portion of the pressurized portion of the exhaust gas so as to mix the first portion of the pressurized portion of the exhaust gas with the fuel upstream of said combustor, and said outlet of said exhaust gas compressor being connected to said combustor such that said combustor receives a second portion of the pressurized portion of the exhaust gas;
   an exhaust gas boiler for receiving the exhaust gas generated by said gas turbine, said exhaust gas boiler being operable to heat feed water using the exhaust gas as a heating medium so as to generate steam; and
   a steam turbine for receiving the steam generated by said exhaust gas boiler, said steam turbine being operable to be driven by the steam and to generate exhaust steam.

4. The combined power plant of claim 3, further comprising a condenser for receiving the exhaust steam generated by said steam turbine, said condenser being operable to condense the exhaust steam into the feed water, an outlet of said condenser being connected to said exhaust gas boiler such that said exhaust gas boiler receives the feed water.

5. The gas turbine system of claim 3, wherein said outlet of said exhaust gas compressor is connected to said gas turbine such that said gas turbine receives a third portion of the pressurized portion of the exhaust gas so as to be cooled by the third portion of the pressurized portion of the exhaust gas.

* * * * *